US011721351B2

(12) United States Patent
Larsen

(10) Patent No.: US 11,721,351 B2
(45) Date of Patent: Aug. 8, 2023

(54) REMOTE AUDIO PICKUP AND NOISE CANCELLATION SYSTEM AND METHOD

(71) Applicant: BBY Solutions, Inc., Richfield, MN (US)

(72) Inventor: Jan Larsen, Hudson, WI (US)

(73) Assignee: BBY Solutions, Inc., Richfield, MN (US)

( * ) Notice: Subject to any disclaimer, the term of this patent is extended or adjusted under 35 U.S.C. 154(b) by 0 days.

(21) Appl. No.: 17/519,243

(22) Filed: Nov. 4, 2021

(65) Prior Publication Data

US 2022/0059113 A1  Feb. 24, 2022

Related U.S. Application Data

(63) Continuation of application No. 16/712,273, filed on Dec. 12, 2019, now Pat. No. 11,170,798.

(Continued)

(51) Int. Cl.
*G10L 21/0216* (2013.01)
*G10L 15/22* (2006.01)
*H04R 3/00* (2006.01)

(52) U.S. Cl.
CPC .......... *G10L 21/0216* (2013.01); *G10L 15/22* (2013.01); *H04R 3/005* (2013.01); *G10L 2021/02165* (2013.01)

(58) Field of Classification Search
CPC ..... G10L 21/0216; G10L 15/22; G10L 15/00; G10L 21/0232; G10L 21/0208;
(Continued)

(56) References Cited

U.S. PATENT DOCUMENTS 11,170,798 B2 * 11/2021 Larsen ................ G10L 21/0208
2003/0005462 A1  1/2003 Broadus et al.
(Continued)

FOREIGN PATENT DOCUMENTS

EP  0867860 A2 *  9/1998  ............. G10L 20/50
EP  0867860 A2  9/1998
(Continued)

OTHER PUBLICATIONS

Infineon, MEMS microphone mechanical and acoustical implementation, AN557, Infineon Technologies AG, Munic, Germany.
(Continued)

*Primary Examiner* — Yogeshkumar Patel
(74) *Attorney, Agent, or Firm* — Forsgren Fisher; Daniel A. Tysver; James M. Urzedowski

(57) ABSTRACT

A video system and method are presented that uses an output-receiving microphone mounted on the housing of the video system to receive a signal representative of the output of a speaker in a use-environment. This signal is compared with a second signal received from a spoken-word microphone that is mounted more remotely from the speaker. In some embodiments, the spoken-word microphone is positioned in a low-pass filter tune pipe and is combined with a separate spoken-word microphone in a tuned microphone array so as to filter out frequencies not associated with the human voice. The two signals are magnitude matched, and the first signal is subtracted from the second to generate an improved voice signal for a voice recognition system.

20 Claims, 6 Drawing Sheets

Related U.S. Application Data

(60) Provisional application No. 62/778,389, filed on Dec. 12, 2018.

(58) Field of Classification Search
CPC ........... G10L 2021/02165; G10L 2021/02082; H04R 3/005; H04R 1/406; H04R 2410/05; H04R 2499/15; H04R 1/2853; H04R 1/265
See application file for complete search history.

(56) References Cited

U.S. PATENT DOCUMENTS

| | | |
|---|---|---|
| 2011/0206214 A1 | 8/2011 | Christoph et al. |
| 2014/0278385 A1* | 9/2014 | Fan ..................... G10K 11/002 704/226 |

FOREIGN PATENT DOCUMENTS

| | | | |
|---|---|---|---|
| EP | 1085782 A2 * | 3/2001 | ............. G10L 15/26 |
| EP | 1085782 A2 | 3/2001 | |

OTHER PUBLICATIONS

Mar. 26, 2021 USPTO Office Action (U.S. Appl. No. 16/712,273)—Our Matter 5884.

* cited by examiner

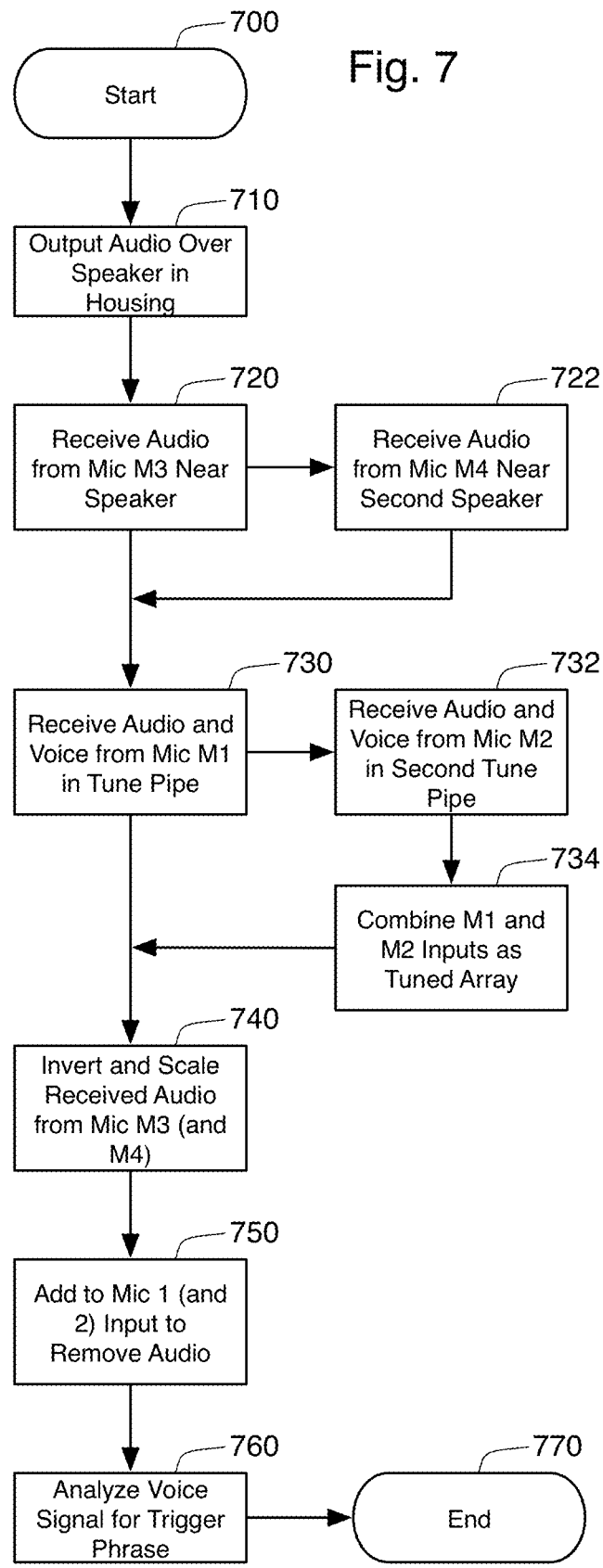

REMOTE AUDIO PICKUP AND NOISE CANCELLATION SYSTEM AND METHOD

RELATED APPLICATIONS

This application is a continuation of U.S. patent application Ser. No. 16/712,273, filed on Dec. 12, 2019 (now U.S. Pat. No. 11,170,798), which in turn claimed the benefit of U.S. Provisional Patent Application No. 62/778,389, filed on Dec. 12, 2018, both of which are hereby incorporated by reference in their entireties.

FIELD OF THE INVENTION

This invention relates to improved audio pickup usable for voice command in a television set or other flat panel video system.

SUMMARY

One embodiment of the present invention provides for improved spoken command recognition in a flat panel video system. In this embodiment, the video system has stereo output speakers and two pairs of microphones. The first pair of microphones are located to receive the output of the two stereo speakers as modified by the physical dynamics of the video system as well as the acoustic interactions of the area surrounding the video system. The outputs of these two microphones are processed separately, one for each of the two stereo channels.

The second pair of microphones receive spoken audio from a user. These microphones are mounted within tune pipe cavities that acoustically filter out some frequencies outside those normally associated with the human voice. By locating microphones in pipes of the correct length and diameter, an improvement of signal quality in the desired frequencies can be obtained having an approximately twenty percent improvement. In addition, the inputs from these two microphones can be combined together so as to create a tuned array that maximizes the sensitivity of the microphones in the human voice frequency range.

The signals from the first pair of microphones are considered to represent the "noise" that must be filtered out from the combined signal from the second pair of microphones. Unlike prior art devices, where the electrical signal that is submitted to the speaker system is used to provide this filter, there is no need for a delay to be used in the present environments. Rather, the present invention compares live signals from first pair of microphones without any delay estimates. The signal from the first pair of microphones is inverted, scaled, and then added against the combined signal from the second pair of microphones to subtract the background noise generated by the speaker output. The scaling is accomplished by analyzing the relative power spectrum of the signals at a selected frequency. One of the signals is scaled to match the others, and the addition of the inverted noise signal to the combined signal from the second pair of microphones is completed. The result is an improved spoken-word signal in which the output from the speakers is, in large part, canceled out. The improved spoken-word signal can then be analyzed for the presence of the trigger phrase for an intelligent assistant that controls the flat panel video system.

BRIEF DESCRIPTION OF THE DRAWINGS

FIG. 7 is a flow chart showing a method of using the system of FIG. 6.

DETAILED DESCRIPTION

Figure 1:
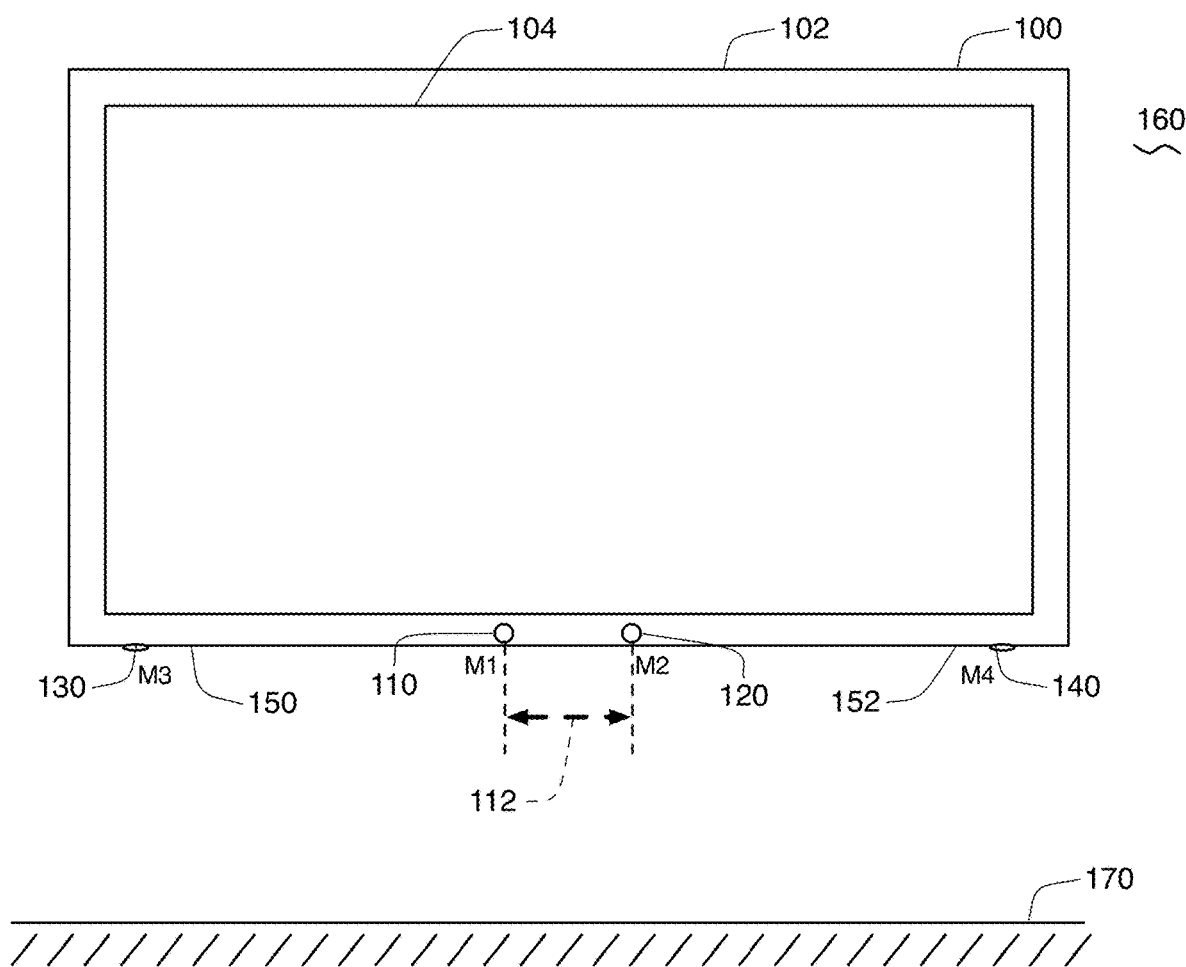
FIG. 1 shows a television mounted on a wall incorporating one embodiment of the present invention including speaker output microphones and a voice microphone array.

FIG. 1 shows a flat panel video system 100 having a housing 102 that holds a flat panel display 104. This video system 100 incorporates a noise cancellation system to improve spoken word recognition. The flat panel video system 100 (sometimes referred to herein as television or video system 100) is designed to output audio associated with the video shown on display 104 through speakers. In many embodiments, the speakers are mounted in the housing 102 of the television 100. In FIG. 1, two speakers 150, 152 are mounted in the housing 102 on the bottom of the television 100 in order to provide stereo output.

The flat panel video system 100 in FIG. 1 is designed to operate under voice control. Voice operated systems usually operate in connection with a trigger word or phrase that is spoken in order to begin a command sequence to the device. Use of trigger phrases is common in voice-controlled devices, with Google devices (from Google LLC. of Menlo Park, Calif.) use the trigger phrase "OK Google", while Apple devices (from Apple, Inc. of Cupertino, Calif.) using the phrase "Hey Siri." Microphones on these devices provide sound input to processors that are programmed to identify the spoken trigger phrase in the input. When recognized, the words following the trigger words are analyzed for a voice command. When the voice-controlled device is also capable of producing sound, such as a smart speaker device or a voice-controlled television, the sound output by the device can interfere with the voice recognition process. It is common to reduce the volume of the sound output of the device once the trigger phrase is identified for ease in understanding the remaining command words. However, it can be difficult to identify the trigger phrase in the first place when the voice-controlled device is itself generating audio output that is received by the microphone used for voice command reception.

The system 100 of FIG. 1 addresses this problem through a unique configuration of microphones on the housing 102 of the device 100. Microphone M1 110 and Microphone M2 120 are primarily responsible for receiving voice commands. Microphone M3 130 and microphone M4 140 are placed near the left speaker 150 and right speaker 152, respectively, and are responsible for receiving the output of the speakers 150, 152 in the ambient environment.

Figure 2:
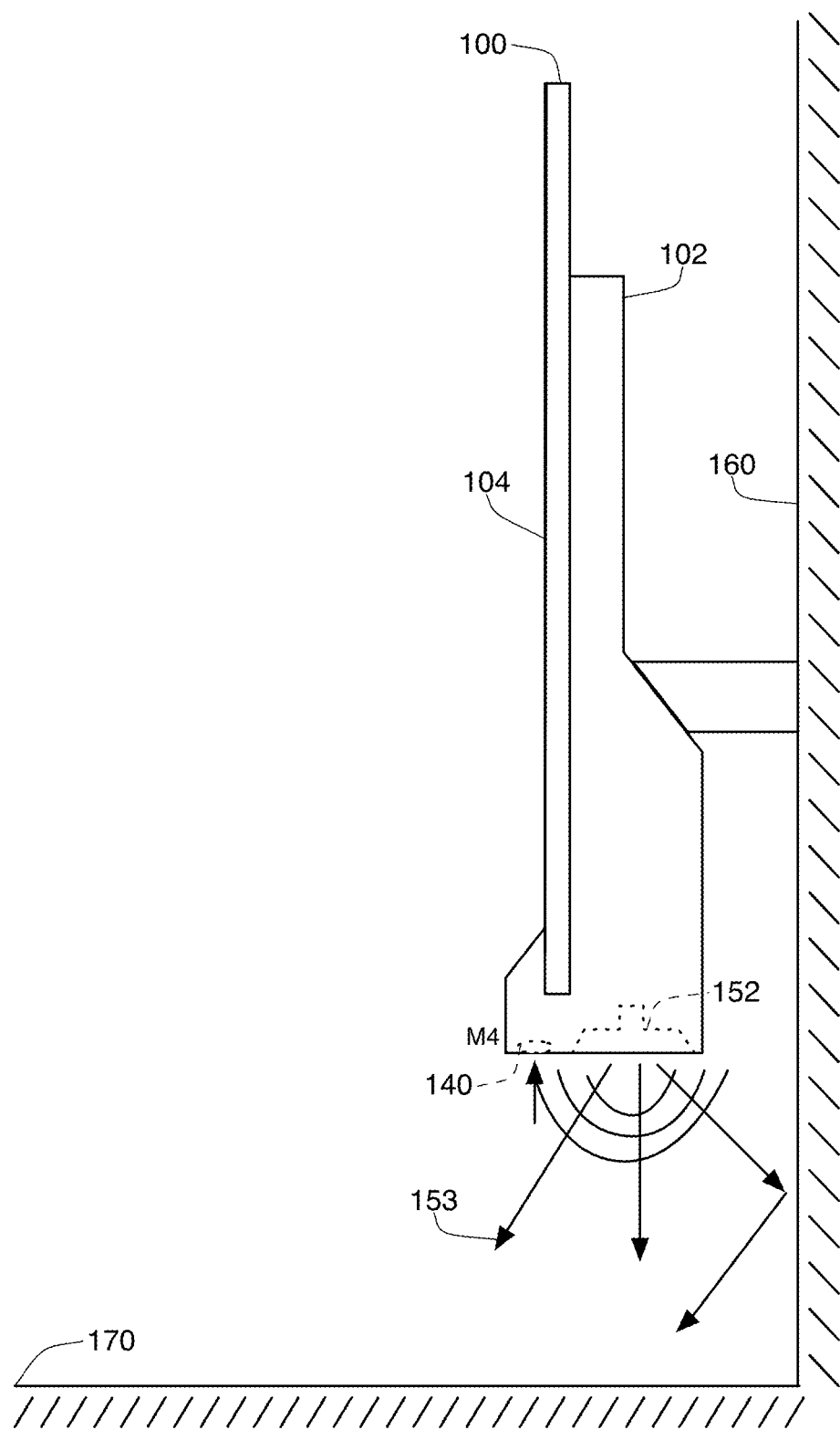
FIG. 2 shows a side view of the television of FIG. 1 identifying the location of a speaker output microphone near an output speaker.

Microphones M3 130 and M4 140 can be referred to as output-receiving microphones, since they are placed primarily to receive and analyze the output of the speakers 150, 152 of the video system 100. As shown in FIG. 1, the video system 100 is mounted on a wall 160 above a floor 170. This can also be seen in the side view of FIG. 2. The right speaker 152 is mounted within the housing 102 of the video system 100 and is shown in dotted lines in FIG. 2. The output 153 of this speaker 152 is naturally impacted by the design and construction of the speaker 152, as well as the manner of mounting the speaker 152 to the housing 102. In addition, the physical dynamics of the housing 102 and the rest of the video system 100 can modify the resulting sound output, as the housing 102 and other components can resonate with and echo back the output of the speaker 152. In addition, the environment (such as wall 160 and floor 170) will greatly impact the sound that is created by speaker 152. These environmental features 160, 170 will absorb and reflect the sound output, with such absorption and reflection frequently varying according to the frequencies of the sound. In other words, the actual sound that is generated by the speaker 152 mounted within housing 102 in a particular environment (such as near wall 160 and floor 170) may be very different that the audio signal that was originally fed to the speaker 152.

By mounting microphones M3 130 and M4 140 adjacent to speakers 150, 152, respectively, the output from the speakers 150, 152 as impacted by the housing 102 and the environment can be fed back into the video system 100. As explained in more detail below, using feedback data taken from microphones M3 130 and M1140 that receive sound data from outside the housing 102 greatly improves the sound cancelling process that allows for detection of trigger words. In addition, by positioning the output receiving microphones 130, 140 adjacent the speakers 150, 152, the output from the speakers 150, 152 will generally overpower any input from voice commands that is received at these output receiving microphones 130, 140.

The video system 100 of FIG. 1 also uses two additional, separate microphones M1 110, M2 120 to receive spoken audio from a user. These can be referred to as spoken-word microphones 110, 120, as their primary responsibility is to receive the spoken commands of a user. While the output-receiving microphones 130, 140 are mounted on housing 102 so as to maximize the sound input related to the output of the video system speakers 150, 152 vis-à-vis the spoken commands, the spoken-word microphones 110, 120 are mounted so as to maximize the sound input related to the spoken commands vis-à-vis the output of the video system speakers 150, 152. In other words, the spoken-word microphones 110, 120 are ideally mounted so as to be acoustically remote from the speakers 150, 152. For example, instead of being mounted proximal to the speakers 150, 152 (like the output-receiving microphones), these microphones 110, 120 are mounted remote from those speakers 150, 152. Thus, where the speakers 150, 152 are mounted proximal to the left and right side of the video system 100, respectively, the spoken-word microphones are mounted proximal to the center of the video system 100. In fact, the array formed by the combination of the two microphones 110, 120 is, in the embodiment of FIG. 1, exactly centered on the bottom of the front face of the video system 100. In addition, where the speakers 150, 152 fire downward from the video system 100, the spoken-word microphones 110, 120 can be mounted to receive audio from the front face of the video system 100. Furthermore, the spoken-word microphones 110, 120 can be mounted using rubber or rubber-like gaskets to vibrationally isolate the microphones 110, 120 from the vibrations of the housing 102. In spite of this intention when mounting the microphones 110, 120, 130, 140 on the video system 100, the output-receiving microphones 130, 140 will receive a small signal originating in the spoken commands, and the spoken-word microphones 110, 120 will receive a more substantial audio signal originating from speakers 150, 152.

To compensate for this, the spoken-word microphones 110, 120 are mounted to the housing 102 in a manner to help filter out those frequencies outside those normally associated with the human voice. This can be accomplished by mounting the microphones 110, 120 so that their inputs can be combined to create a tuned array that maximizes the sensitivity of the microphones in the human voice frequencies. To accomplish this, the two microphones are mounted as to form a broadside array with the two microphones 110, 112 separated from each other by a distance 112 of approximately 75 mm. This distance 112 may range between 50 mm and 100 mm, but a distance of approximately 75 mm (e.g., between 65 and 85 mm) is preferred. In this array, the "front" of the array is directed perpendicularly away from the display screen 104 of the video system 100. The "sides" of the array are to the left and the right of the video system 100.

In the present invention, the input from the two microphones 110, 120 are summed together. Because of the positioning of the microphones, sound coming from the front of the array will hit both microphones effectively simultaneously, and the input of the two microphones 110, 120 will be summed together without any significant interference between the two signals. However, sound coming from the sides of the microphone array 110, 120 is attenuated. This is because sound coming from the sides will hit one microphone, such as microphone M2 120 first, and then hit the other microphone (M1 110) at a later time. Sound waves of the correct frequency moving in this direction will cancel each other out when the input from the two microphones 110, 120 are summed together. At a distance of 75 mm, this cancellation occurs at a wavelength of twice this distance (150 mm), which is a frequency of about 2.3 KHz. Sounds that are close to this frequency are attenuated, but not completely canceled out. Furthermore, sounds near the cancellation frequency that approach the microphone broadside array from an angle other than directly in front of the array will also be attenuated. This cancellation and attenuation is also repeated at higher frequencies above 2.3 KHz. Human speech is generally of a much lower frequency (from 85 to 255 Hz) and is therefore not significantly attenuated even when approaching the broadside array 110, 120 from the sides.

As a result, summing the input of the two spoken-word microphones 110, 120 results in reduced sensitivity to ambient noise in the environment that has a frequency above that of human speech. While not all such frequencies above human speech are filtered by the use of the broadside array, the reduction in non-speech sound being received by the spoken-word microphones significantly increases the signal-to-noise ratio when analyzing human speech.

Figure 3:
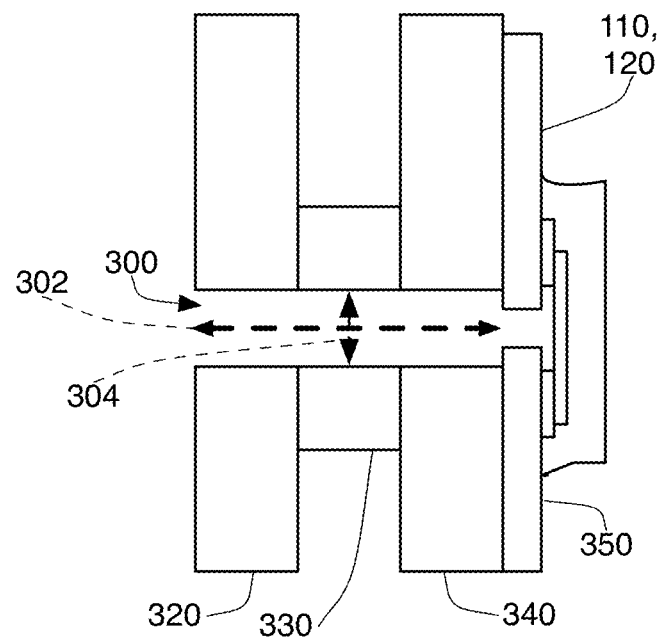
FIG. 3 shows a cut-away side view of an acoustic channel used for a voice command microphone.

In addition to using the tuned or broadside array of two microphones, one embodiment of the present invention also locates the spoken-word microphones 110, 120 within tune pipes that can filter out frequencies not associated with the human voice. By locating microphones in pipes of the correct length and diameter, an improvement of signal quality in the correct frequencies can be obtained having an approximately twenty percent improvement. FIG. 3 shows an example of a straight tuned pipe 300. The pipe 300 is a cavity formed by aligned holes in the exterior plastic 320 (which can form part of the video system housing 102), a gasket 330, and a printed circuit board (or PCB) 340. A MEMs (Micro Electromechanical System) microphone 350 is positioned at the end of these holes in order to receive sound waves that travers the tuned pipe 300.

The pipe 300 can also be thought of an acoustic channel that is used by the microphone 350. While many designers have insisted that the acoustic channel be short and wide in order to reduce Helmholtz resonance, pipe 300 is ideally sized relatively narrowly with a diameter 304 of under 2 mm. In one configuration, the pipe 300 has a length 302 of 6 mm and a width or diameter 304 of 1 mm. It is possible to get similar results with a length and a width within 33% of these dimensions.

The resonance frequency of a cavity of this configuration is governed by the formula:

$$F = \frac{C \times D}{4\sqrt{\pi \times V \times \left(L + \sqrt{\pi} \times \frac{D}{2}\right)}}$$

where F is the resonance frequency, C is the speed of sound, D is the diameter of the cavity, V is the volume of the cavity, L is the length of the cavity. Based on this formula, a pipe of 6 mm by 1 mm will resonate at 13.4 KHz.

The tuned pipe 300 of FIG. 3 will function as an acoustic or mechanical low pass filter. In the preferred embodiment, the sound is sampled at the microphone 350 about 16,000 per second, or at a frequency of 16 KHz. This high frequency of sampling would normal require that either an active or digital filter be applied to the sampled signal. By using a tuned pipe of around 13.4 KHz, an acoustic low pass filter is created which reduces the need for active filters and/or reduces the need for increased processing power to handle digital filters. The tuned pipe 300 effectively helps to further boost the lower frequency human voice input by filtering noises at other frequencies produced by the speakers 150, 152.

Figure 4:
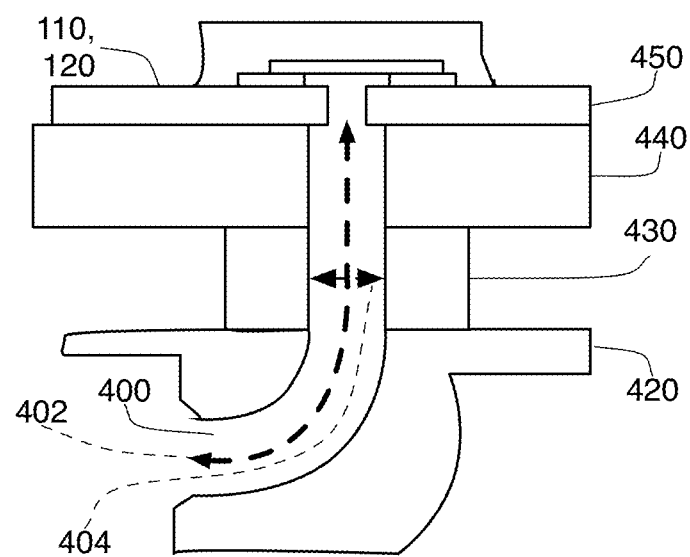
FIG. 4 shows a cut-away side view of a curved acoustic channel used for a voice command microphone.

In some instances, it is difficult to mount the microphone 350 horizontally so that the pipe 300 is facing generally toward the users of the video system 100. FIG. 4 shows an alternative configuration for a tuned pipe cavity 400 that includes a ninety-degree bend. Sound still enters the cavity 400 through a plastic layer 420 that can form part of the housing 102 of the television 100. In this case, the ninety-degree bend takes place entirely within the plastic layer 420, which means that the gasket 430, PCB 440, and the opening in the MEMs microphone 450 can be configured without any bend in the same manner as shown in FIG. 3. The curved configuration of cavity 400 still provides the same acoustic filtering as the cavity 300 as long as the length 402 and width 404 of the cavity 400 remain similar as well.

As explained above, the inputs from the two spoken-word microphones 110, 120 are combined together. However, the two output-receiving microphones are processed separately, one for each of the two stereo channels. The input from the output-receiving microphone is considered to represent the "noise" that must be filtered out from the spoken-word microphone input. This is similar to the filtering that took place in prior art designs, such as the prior art configuration 500 showed in FIG. 5. In this design, an audio source 510 such as a tuner, a DVD player, or an external video player provided an audio signal for use by a speaker 540. The audio signal could take the form of a stream of digital bits that could be stored and manipulated in an output buffer 520. This audio stream is then submitted to an audio output processor 530, which may include both a digital signal processor (a "DSP") and an amplifier. The amplified signal from this processor 530 is then submitted to a speaker 540.

The speaker 540 outputs a sound (shown as audio sound arrows 542 on FIG. 5) that could be enjoyed by the users of the television 100. When the user wished to control the TV 100, they would use a voice command (shown as voice sound arrow 544 in FIG. 5). A microphone 550 would detect both the voice command 544 and the ambient audio sound 542 and transmit a combined audio and voice signal 564 to be processed by the voice recognition system (not shown). Before being submitted for voice recognition, the prior art does attempt to compensate for the audio sound 542 that originated at speaker 540 but was detected by microphone 550. This is accomplished by taking an audio signal 562 from either the output buffer 520 or from the output of the DSP/amplifier 530 and combining the signals at a sound mixer 560. Although audio signal 562 is shown in FIG. 5 as coming from both the output buffer 520 and the amplifier 530, in practice only one source is generally necessary.

An audio cancelation circuit 570 (which may take the form of a programmed processor) is responsible for the proper mixing of the signals 562 and 564 in order to best cancel out the audio signal 542 from the microphone output 564. Unfortunately, because the actual audio sound 542 must travel out the speaker 540 and then around the room before it is picked up by microphone 550, the audio signal 562 from the output buffer 520 or DSP/amp 530 must be delayed. This is known as the echo time, which represents the time it takes for the electrical signal to be processed by the amplifier 530 and other circuitry and then drive the speaker 540, plus the time for the sound waves to bounce off an obstruction and return to the microphone 550. This delay for the echo time is shown by boxes 522, 532. The amount of delay required in each circumstance can be determined through trial and error so that the outgoing audio signal 562 will approximately match up with the audio signal portion of the combined voice and audio signal 564. If the audio signal 562 is properly delayed, inverted, and power matched, much of the audio signal in the combined microphone output 564 can be canceled, resulting in an output signal 572 that can be fed into voice recognition programming.

Figure 5:
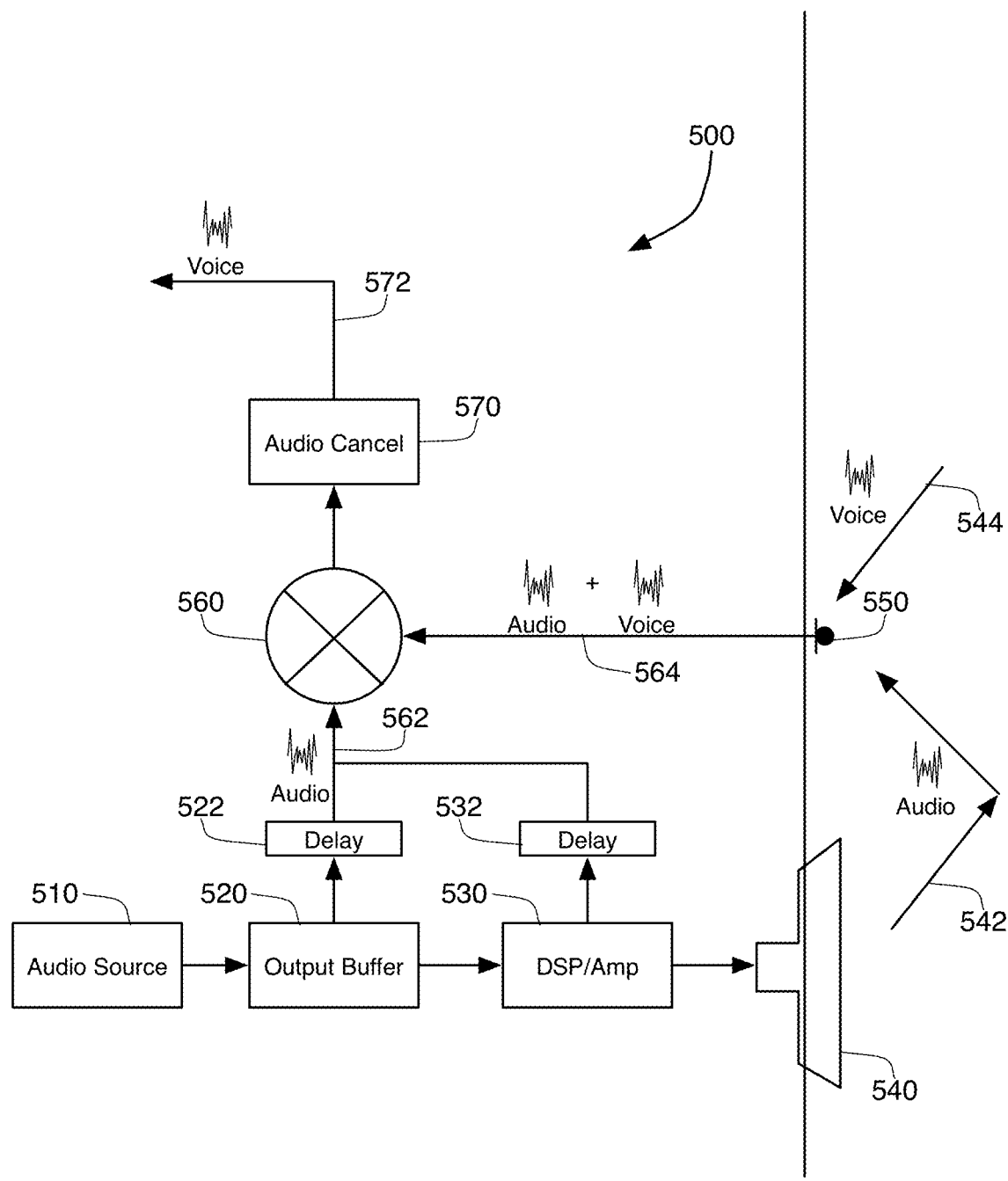
FIG. 5 shows a schematic diagram of a prior art noise cancellation system.
Figure 6:
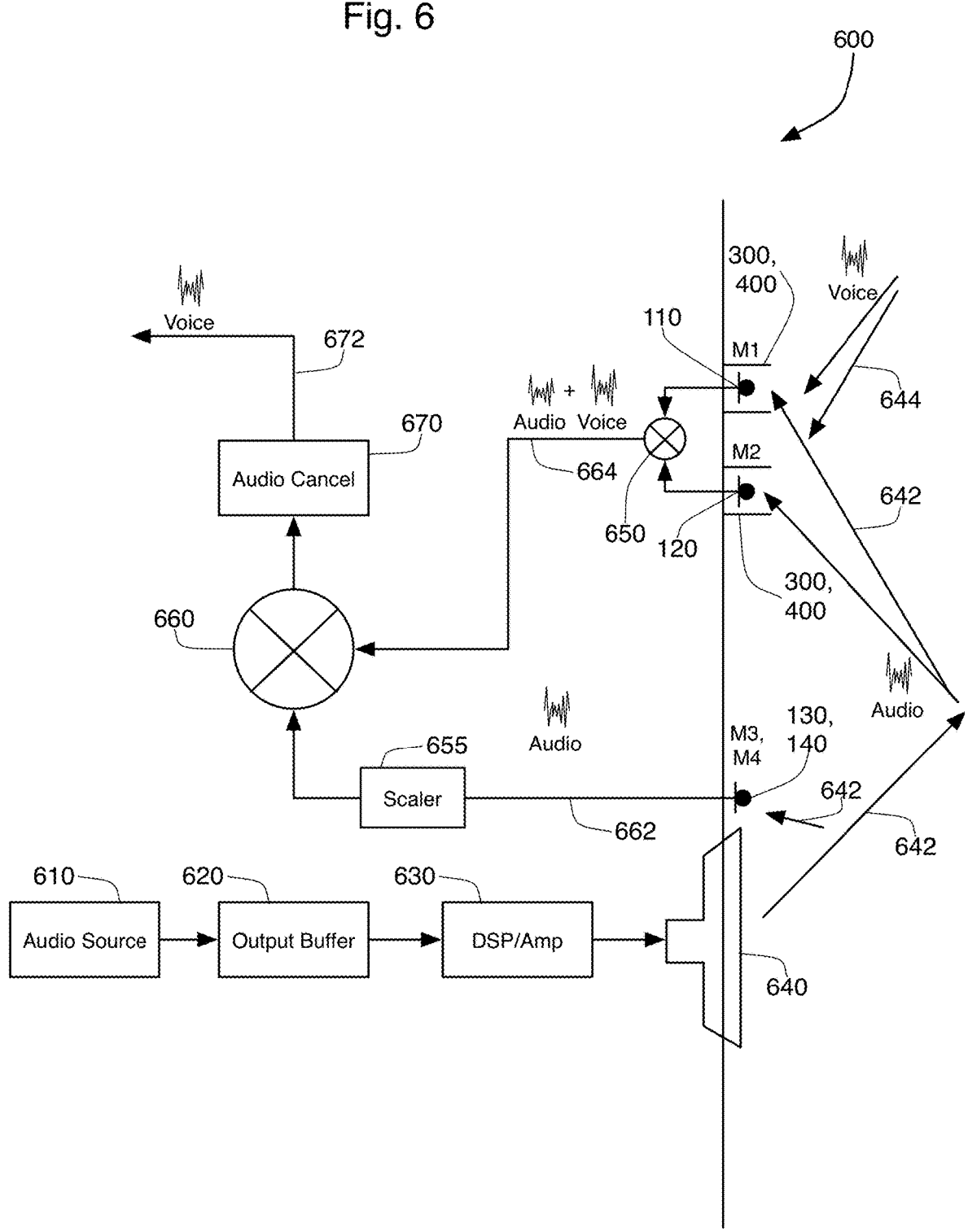
FIG. 6 shows a schematic diagram of one embodiment of a flat panel video system noise cancellation system of the present invention.

In contrast to the prior art technique of FIG. 5, the video system 100 uses a different technique for filtering out the audio output of the device 100 before submitted a microphone signal for speech recognition. The system 600 that accomplishes this is shown in FIG. 6. This system 600 uses method 700 to perform this filtering technique, which is shown in FIG. 700. The first step 710 of this method is to output device audio 642 over speaker 640. As was the case with system 500, this audio 642 originated with an audio source 610, and may have passed through an output buffer 620 and a DSP/amplifier 630 before being output by the speaker 640. While the prior art system 500 used delays 522, 532 to compensate for the estimated echo time, system 600 requires no such delay. Instead, at step 720, output-receiving microphone M3 130 receives the actual output from speaker 640. As explained above, this microphone M3 130 is positioned near speaker 150 so as to receive the audio signal 642 as output by the speaker and as impacted by the surrounding environment. While only one such microphone 130 is required to perform this method, the preferred embodiment uses two microphones M3 130 and M4 140 to listen to the output of each of the stereo speakers 150, 152. This is seen in optional step 722 in FIG. 7.

At step 730, microphone M1 110 receives a combination of a voice command 644 and the audio signal 642 that originated at speaker 640. This microphone 110 is preferably located within a low pass tune pipe (such as the pipes 300, 400 shown in FIGS. 3 and 4) so as to prevent some of the non-voice sounds from reaching the microphone 110. Step 732 shows that, while it is not mandatory, the preferred embodiment uses two spoken-word microphones, meaning that audio is also received at microphone M2 120 at the same time. The output from these two microphones 110, 120 are combined at mixer 650 at step 734. By controlling the distance between the microphones 110, 120, a tuned array is created that is able to filter out certain non-voice frequencies from the combined audio and voice output signal 644.

The signal from the output-receiving microphone is then inverted and scaled at step 740 at scaler 655, and then added against the combined signal 644 from the spoken-word microphones 110, 120 at mixer 600 in order to subtract the background audio noise (step 750). The scaling is accomplished by analyzing the relative power spectrum of the output-receiving microphone signals 662 and the spoken-word signal 664. This can be accomplished by applying a Fourier transform function (such as a discrete Fourier transform or DFT, or a fast Fourier transform or FFT) to the signals 662, 664. The magnitude of the output of the Fourier transform for the two signals for a selected frequency (such as 2 kHz) is compared. One of the signals is scaled to match the others (step 740), and the addition of the inverted output-receiving microphone signal 662 to the spoken-word signal 664 (i.e., the subtraction of the output-receiving signal 662 from the spoken-word signal 664) is completed at step 750. The result is an improved spoken-word signal 672 in which the output from the speakers is, in large part, canceled out. The improved spoken-word signal can then be analyzed for the presence of the trigger phrase through voice recognition circuitry (not shown) at step 760. The process 700 then ends at step 770.

Schematically, the inverting and mixing is shown in FIG. 6 as being performed by mixer 660 and audio cancel circuitry 670, while the scaling of the output-receiving signal 662 is shown as being performed by the scaler circuitry 655. In practice, these functions can be controlled by the same specially or generally programmed processors. For example, these functions could be programmed into a general-purpose processing unit, such as a CPU manufactured by Intel Corporation (Mountain View, Calif.) or Advanced Micro Devices, Inc. (Sunnyvale, Calif.) for using in computing and server devices. More frequently, however, these functions will be performed by digital signal processing (DSP) units specifically designed to process audio signals. Functions that are shown as performed by separate units in FIGS. 6 and 7 could easily be performed by a single such processing unit.

The many features and advantages of the invention are apparent from the above description. Numerous modifications and variations will readily occur to those skilled in the art. Since such modifications are possible, the invention is not to be limited to the exact construction and operation illustrated and described. Rather, the present invention should be limited only by the following claims.

What is claimed is:

1. A system with voice control comprising:
a) a housing;
b) a speaker mounted in the housing;
c) an amplifier that feeds an amplified audio signal to the speaker;
d) a first microphone mounted on the housing proximal to the speaker, the first microphone providing a first signal;
e) a second microphone mounted on the housing providing a second signal; and
f) circuitry receiving the first signal and the second signal, wherein the circuitry:
   i) alters a first magnitude of one of the first signal and the second signal so as to approximately match a second magnitude of the other signal;
   ii) subtracts the first signal from the second signal to create an improved voice signal; and
   iii) submits the improved voice signal to a voice recognition system.

2. The system of claim 1, wherein the second microphone is mounted to be acoustically remote from the speaker.

3. The system of claim 1, wherein the speaker is mounted proximal to a first side of the housing, and the second microphone is mounted proximal to a center of the housing.

4. The system of claim 1, wherein the second microphone is mounted within a tune pipe that creates an acoustic filter for incoming sound reaching the second microphone.

5. The system of claim 4, wherein the tune pipe has a cavity having dimensions within 33% of 1 mm of diameter and 6 mm in length.

6. A method for filtering out audio signal originating from a speaker comprising:
a) transmitting the audio signal out of the speaker;
b) receiving a first signal from a first output-receiving microphone mounted proximal to the speaker;
c) receiving a second signal from a first spoken-word microphone mounted not proximal to the speaker;
d) subtracting the first signal from the second signal to create an improved voice signal; and
e) submitting the improved voice signal to a voice recognition system.

7. The method of claim 6, wherein the second signal is received by combining a first output from the first spoken-word microphone and a second output from a second spoken-word microphone also mounted not proximal to the speaker.

8. The method of claim 7, wherein the first spoken-word microphone and second spoken-word microphone are mounted approximately 75 mm from each other to form a tuned microphone array.

9. The method of claim 7, wherein the first spoken-word microphone and second spoken-word microphone are mounted such that inputs to the microphones are in communication with separate cavities that each act as an acoustic filter to filter out some frequencies not associated with human speech.

10. The method of claim 9, wherein the separate cavities are approximately 1 mm in diameter and approximately 6 mm in length.

11. A system with voice control comprising:
a) a housing;
b) a speaker mounted in the housing that outputs an amplified audio signal;
c) a tune pipe cavity at least partially formed in the housing;
d) a microphone mounted in the tune pipe cavity, wherein the tune pipe cavity is configured to have a length, diameter, and volume that creates an acoustic filter for incoming sound to the microphone that filters out some frequencies not associated with human speech; and
e) circuitry receiving a microphone signal from the microphone and submits the microphone signal to a voice recognition system.

12. The system of claim 11, wherein the tune pipe cavity is cylindrical.

13. The system of claim 12, wherein the tune pipe cavity has a diameter of less than 2 mm.

14. The system of claim 13, wherein the tune pipe cavity has a width dimension within 33% of 1 mm of diameter and a length within 33% of 6 mm.

15. The system of claim 11, wherein the tune pipe cavity has a width dimension within 33% of 1 mm of diameter and a length within 33% of 6 mm.

16. The system of claim 11, wherein the tune pipe cavity has a bend.

17. The system of claim 16, wherein the bend is a 90-degree bend.

18. The system of claim 17, wherein the tune pipe cavity passes through a housing hole in the housing, through a gasket, and through a PCB hole in a printed circuit board onto which the microphone is mounted; further wherein the gasket vibrationally isolates the microphone from vibrations in the housing; and further wherein the bend is formed as part of the housing hole.

19. The system of claim 11, wherein the tune pipe cavity passes through a housing hole in the housing, through a gasket, and through a PCB hole in a printed circuit board on which the microphone is mounted.

20. The system of claim 19, wherein the gasket vibrationally isolates the microphone from vibrations in the housing.

* * * * *